United States Patent [19]
Shiba

[11] Patent Number: 5,383,464
[45] Date of Patent: Jan. 24, 1995

[54] ULTRASONIC DOPPLER DIAGNOSTIC SYSTEM

[75] Inventor: Akira Shiba, Kawasaki, Japan

[73] Assignee: Fujitsu Limited, Kawasaki, Japan

[21] Appl. No.: 904,647

[22] Filed: Jun. 26, 1992

[51] Int. Cl.⁶ .............................................. A61B 8/06
[52] U.S. Cl. .............................................. 128/661.09
[58] Field of Search ............... 128/661.08–661.10; 73/861.25

[56] References Cited

U.S. PATENT DOCUMENTS

| | | | |
|---|---|---|---|
| 4,450,446 | 5/1984 | Clancy et al. | 343/7.7 |
| 4,961,427 | 10/1990 | Namekawa, deceased et al. | 128/661.09 |
| 5,107,841 | 4/1992 | Sturgill | 128/661.09 |
| 5,109,858 | 5/1992 | Nishiyama et al. | 128/661.09 |
| 5,163,434 | 11/1992 | Kumazawa | 128/661.09 |
| 5,170,792 | 12/1992 | Sturgill et al. | 128/661.09 |
| 5,190,044 | 3/1993 | Kawasaki et al. | 128/661.09 |

*Primary Examiner*—Francis Jaworski
*Attorney, Agent, or Firm*—Staas & Halsey

[57] ABSTRACT

Disclosed is an ultrasonic doppler diagnostic system for obtaining blood flow information in the human body under examination utilizing ultrasonic Doppler effect, comprising: a clutter information detecting means for obtaining a moving velocity and/or its variance of clutter components on the basis of a received signal; a clutter information removing means for obtaining a clutter removing signal by removing clutter component information carried in the received signal from the received signal on the basis of the obtained moving velocity and/or variance; and a blood flow detecting means for obtaining blood flow information on the basis of the clutter removing signal. With this arrangement, it is possible to selectively remove only the clutter component information, provided that even if the blood flow is very slow, the Doppler shift frequencies of the blood flow component and clutter components are different from each other.

8 Claims, 13 Drawing Sheets

ULTRASONIC DOPPLER DIAGNOSTIC SYSTEM

BACKGROUND OF THE INVENTION

1. Field of the Invention

The present invention relates to an ultrasonic doppler diagnostic system for obtaining blood flow information, within the human body under examination, utilizing an ultrasonic Doppler effect, and more specifically, to an ultrasonic doppler diagnostic system capable of detecting low velocity blood flow component information separately from clutter component information.

2. Description of the Related Art

There has been used an ultrasonic diagnostic system for, transmitting ultrasonic beams within the human body and receiving the ultrasounds reflected by tissue in the human body, thus diagnosing diseases of the viscera and the like. In one aspect of this ultrasonic diagnostic system, or in an optional function of an ultrasonic diagnostic system for displaying a tomographic image (B-mode), there has been used an ultrasonic diagnostic system for receiving ultrasounds reflected by blood cells flowing within the human body thereby obtaining blood flow information such as velocity, variance, power and the like of the blood flow.

FIG. 10 is a schematic construction view of one example of a conventional ultrasonic diagnostic system.

A transmission control section 11 supplies pulse signals Tp to a number of transducers (not shown) constituting an ultrasonic probe 12 in each specified timing. Thus each transducer transmits ultrasonic pulse beams within the human body under examination (not shown). For example, in sector scanning, a specified number (e.g. eight pulses) of ultrasonic pulse beams are emitted along a given direction. The ultrasonic pulse beams are reflected by blood cells flowing within the human body under examination or the other tissues, and are received by each transducer in the ultrasonic probe 12. The received signals Ap, received by each transducer, are input to a beamformer 13 and are beamformed therein so as to satisfy reception dynamic focussing. The received signal S thus obtained is input in a B-mode image detecting section 14 and a blood flow information detecting section 15.

The B-mode image detecting section 14 generates a signal $S_A$ for carrying tomographic image (B-mode) display on the basis of the input received signal S. The signal $S_A$ is supplied to a display section 16 composed of a CRT display or the like, thus displaying a tomographic image for diagnosis.

Meanwhile, the blood flow information detecting section 15 detects blood flow information on the basis of the input received signal S utilizing a Doppler effect as described below.

Namely, the ultrasounds reflected by blood cells within the blood flow are subjected to frequency shift by the movement of the blood cells. The frequency shift amount (Doppler shift frequency) $f_d$ is represented as follows:

$$f_d = (2V \cos\theta / C) \cdot f_c \qquad (1)$$

where V is the blood flow velocity, $\theta$ is an angle formed by the two intersecting directions of the blood flow and transmitted ultrasonic beam, $f_c$ is a center frequency of the transmitted ultrasounds and C is a velocity of ultrasounds transmitted within the human body.

Further, the center frequency f of the received signal receiving the reflected ultrasounds is represented as follows:

$$f = f_c + f_d \qquad (2)$$

Accordingly, by detection of the Doppler shift frequency $f_d$ and also detection of a blood vessel extending direction on the basis of the signal SA for carrying the above tomographic image, the blood velocity V can be detected. The Doppler shift frequency fd can be obtained using a wide variety of methods, for example, an auto-correlation method, FFT method, and micro-displacement measuring method [a cross-correlation method (Yagi, et al, "Micro-displacement measurement for inhomogeneous tissue utilizing the spatial correlation of analysis signal", pp. 358–360, Literature of No. 54 Meeting of Japan Ultrasonic Medical Institute); a phase tracking method (Araki, et al, "Tissue displacement measurement in living subject by phase tracking processing", pp. 445–446, Literature of No. 57 Meeting of Japan Ultrasonic Medical Institute, and "Ultrasonic Diagnostic System", Japanese Patent Application No. hei 2-273910, Application Date: Oct. 12, 1989); and a method oriented to observation data (Yamagosi, et al, "Estimation method for micro-displacement in a reflected type independently from the random structure of scatterer", pp. 233–234, Literature of No. 56 Meeting of Japan Ultrasonic Medical Institute, and "Ultrasonic diagnostic system", Japanese Patent Application No hei 2-088553, Application Date: Apr. 3, 1989)].

The signal $S_B$ carrying blood flow information thus obtained is input to the display section 16 and is, for example, superposed on the above tomographic image, so that the blood flows in the directions of approaching to and separating from the ultrasonic probe are displayed, for example, as red and blue, respectively.

Hereafter, the discussion will be directed to Doppler detection by quadrature detection and MTI filtering, which is per se conventional but is modified advantageously in each of the inventive embodiments of FIGS. 2, 4, and 8.

FIG. 11 is a block diagram of one example of a conventional ultrasonic diagnostic system showing a portion equivalent to a blood flow information detecting section as shown in FIG. 10. As shown, the received signal S output from the beamformer is input to a quadrature detector 17 to be detected by 90 degrees. FIG. 12 is a block diagram showing an internal construction of the quadrature detector 17.

The received signal S input to the quadrature detector 17 is divided into two lines, which are respectively input to multipliers 17a and 17b. Meanwhile, the multipliers 17a and 17b receive two sinusoidal signals (carrier signals) SIN, COS different in phase by 90 degrees from each other. The multipliers 17a and 17b multiply the received signal S by the carrier signal SIN, and the received signal S by the carrier signal COS respectively, thus generating two signals $SM_I$ and $SM_Q$, each having both frequencies of addition and difference of the two signals prior to multiplication. These signals $SM_I$ and $SM_Q$ are made to pass through low-pass filters 17c and 17d respectively. This generates an I component $SM_I$ and Q component $SM_Q$ of the received signal S after 90-degree phase detection, each carrying only a signal having the frequency of the difference between the two signals mentioned above, which are output from the quadrature detector 17. The I component $SM_I$ and Q component $SM_Q$ of the received signal S thus output from the quadrature detector 17 are input to respective A/D converters 18a and 18b to be A/D converted, and are then input to respective Moving Target Indicator (MTI) filters 19a and 19b. Each of the MTI filters 19a and 19b is a digital filter for cutting off a low frequency signal, similarly to that used in a radar, and is widely used in the field of the ultrasonic diagnostic systems. It is generally composed of a delay circuit providing a delay time equivalent to the repeated cycle of the pulse signals and integral/adding device. The MTI filters 19a and 19b are used to remove clutter component information. In general, the received signal S includes not only blood flow information but also relatively slow clutter component information mixed as high noise. More specifically, the clutter component is due to the motion of the human body, under examination, other than the blood flow and consequently has a power 100 times as much as the blood flow component. The I component $SC_I$ and Q component $SC_Q$ of a clutter removing signal SC output from the MTI filters 19a and 19b are input in an auto-correlator 20. The auto-correlator 20 generates, by auto-correlation, a signal $S_B$ carrying the blood flow information such as velocity, velocity distribution, power and the like of the blood flow.

FIG. 13a and 13b are views showing the characteristic of the MTI filter.

The abscissa represents a Doppler shift frequency $f_d$ (refer to the equation (1)). Further, a polygonal line 31 represents the characteristic of the MTI filter. The MTI filter has such a characteristic as to cut off the signals within a frequency band of $|fd| \leq Th$ with $f_d=0$ taken as the center and to pass the signals within a frequency band of $|fd| > Th$. Further, crests 32 and 33 represent the Doppler shift frequency distribution of the clutter components and the blood flow carried by the received signal S.

As shown in FIG. 13a, in the case that the blood flow velocity is high and the crest 33 is greatly separated from the crest 32, by determining the signal elimination band of the MTI filter to cut off the clutter component information corresponding to the crest 32 and to pass the blood flow information corresponding to the crest 33, the clutter removing signal SC ($SC_I$, $SC_Q$) from which the clutter component information is selectively removed, can be output. Meanwhile, in the case that the blood flow velocity is very slow and the crest 33 comes closer to the crest 32, as shown in FIG. 13b, there occurs such a problem that, by determining the characteristic of the MTI filter to remove the clutter information, the blood flow component information is also removed, even if the crest 32 is separated from the crest 33 as yet. Accordingly, only the clutter component information cannot be selectively removed. In particular, there has been enhanced the requirement for detecting the blood flow information of the abdomen portion such as the liver, and therefore, it has become important to detect the very slow blood flow having a Doppler shift frequency similar to that of the clutter components.

There has been disclosed such an attempt as to obtain the signal carrying only the blood flow component separately from the clutter components, in Japanese Patent Laid-open sho No. 63-59938, No. hei 1-110351, No. hei 1-314552 and No. hei 2-167151.

In Japanese Patent Laid-open No. sho 63-59938, there is provided a clutter map on the basis of intensity of the reflected ultrasounds and the order of the MTI filter is switched by the clutter map. This technique determines the level of removing the clutter components according to intensity of the clutter components, and is not intended to effectively remove the clutter component information even if the Doppler shift frequency distributions of the clutter components and blood flow component become closer to each other.

In Japanese Patent Laid-open No. hei 1-1103351, there is proposed a technique of extracting the carrier signals SIN and COS as shown in FIG. 12 from the clutter component signal themselves thereby effectively removing the clutter component information. It may be considered that if the carrier signals SIN and COS are correctly extracted, the clutter component information can be effectively removed; however, by the proposed technique, it may be difficult to correctly extract the carrier signals SIN and COS.

The technique disclosed in Japanese Patent Laid-open No. hei 1-314552 is intended to correct the signal including the clutter component information and blood flow information, and accordingly cannot effectively remove only the clutter component information separately from the blood flow information.

Further, in Japanese Patent Laid-open No. sho hei 2-167151, there is proposed a technique of determining the characteristic of the MTI filter for removing the clutter components on the basis of a point Doppler signal. However, the technique complicates the construction because of obtaining the point Doppler signal, and cannot obtain the information per one point due to the point Doppler. Also, in the case of the Doppler shift frequencies of the clutter components and blood flow as shown in FIG. 13b, only the clutter component information cannot be effectively removed.

SUMMARY OF THE INVENTION

Taking the above into consideration, the object of the present invention is to provide an ultrasonic doppler diagnostic system capable of selectively removing only the clutter component information, provided that even if the blood flow is very slow, the Doppler shift frequency thereof is different from that of the clutter components.

FIG. 1 is a block diagram showing the principle of the individual part of an ultrasonic doppler diagnostic system according to the present invention. Hereinafter, the individual part is referred to as the ultrasonic doppler diagnostic system for avoiding the complexity.

The received signal S after delay-adding as mentioned above is input to both a clutter information detecting means 1 and a clutter information removing means 2.

The clutter information detecting means 1 calculates both or either of a moving velocity Vc and its variance $\sigma_c^2$ of clutter components.

In this case, the moving velocity Vc and variance $\sigma_c^2$ of the clutter components are general terms for magnitudes of the average moving velocity and its variance of the clutter components, and accordingly, do not mean the mathematical average velocity and variance. For example, the moving velocity Vc may be determined to be the center value, or (maximum value + minimum value)/2 of the values measured several times, and the variance $\sigma_c^2$ may be determined to be a standard deviation, or (maximum value-minimum value).

The obtainment of the moving velocity Vc and/or its variance $\sigma_c^2$ of the clutter components is not limited but may include; various kinds of micro-displacement measuring methods such as a cross-correlation method, phase tracking method, method oriented to observation data; an auto-correlation method; FFT method; and combination thereof. The above methods are suitably selected according to a point Doppler method of obtaining the blood flow information at one point in the human body under examination, a color Doppler method of obtaining the blood flow information within the two-dimensional cross-section, or the like.

The moving velocity Vc and variance $\sigma_c^2$ obtained by the clutter information detecting means 1 is input to the clutter removing means 2. The clutter information removing means 2 selectively removes the clutter component information included in the input received signal S on the basis of the moving velocity Vc and variance $\sigma_c^2$ obtained in the above clutter information detecting means 1, thereby generating a clutter-removed, received signal SC including only the blood flow component information.

The clutter information removing means 2 is not limited to that specified but may include the following constructions: For example, as shown in the embodiment mentioned later, the complex MTI filter may be determined in its characteristic on the basis of the moving velocity Vc or both the moving velocity Vc and variance $\sigma_c^2$ of the clutter components obtained in the clutter information detecting means 1. Further, the clutter information means 1 obtains only the moving velocity Vc or both the moving velocity Vc and variance $\sigma_c^2$, the phase of the carrier signals in the quadrature detector are controlled on the basis of the moving velocity Vc such that the direct current component of the received signal output from the quadrature detector carries the moving velocity information of the clutter components, and the received signal output from the quadrature detector is input to the MTI filter with the signal elimination band whose band is fixed or to the MTI filter with the signal elimination band whose width is adjusted on the basis of the variance $\sigma_c^2$. In the case that the moving velocity Vc of the clutter components is approximately zero and its variance $\sigma_c^2$ is varied, the clutter information detecting means 1 obtains the variance $\sigma_c^2$ of the moving velocity of the clutter components for taking out the blood flow information when the variance $\sigma_c^2$ is made small, and the band width of the signal elimination band of the MTI filter is determined on the basis of the $\sigma_c^2$. Differently from the various kinds of constructions utilizing the MTI filter and complex MTI filter, for example, in the point Doppler method, there is proposed a construction of obtaining the moving velocity Vc and variance $\sigma_c^2$ of the clutter components on the basis of the received signal including the blood flow and clutter components information (function of the clutter information detecting means 1), and then removing the clutter component information in the frequency space on the basis of the moving velocity Vc and variance $\sigma_c^2$.

Thus the clutter information removing means 2 may include various kinds of constructions.

The clutter-removed, received signal SC output from the clutter information means 2 is supplied to a blood flow information detecting means 3. The blood flow information detecting means 3 obtains the signal $S_B$ displaying blood flow information on the basis of the clutter-removed, received signal SC input thereto. The obtainment of the moving velocity Vc and variance $\sigma_c^2$ of the clutter components is not limited but may include various kinds of micro-displacement measuring methods such as a cross-correlation method, phase tracking method, method oriented to observation data, an auto-correlation method, a FFT method, and combination thereof.

The received signal S input in the clutter information removing means 1 includes not only the clutter component information but also the blood flow information; however, as mentioned above, the clutter components have an extremely great power compared with the blood flow component. Accordingly, although the received signal S includes the blood flow information, the moving velocity and variance of all components carried in the received signal S on the basis thereof may be substantially taken as the moving velocity Vc and variance $\sigma_c^2$ of the clutter components.

In the viewpoint of the above, the present invention is so constructed as to obtain the moving velocity Vc and/or variance $\sigma_c^2$ of the clutter components on the basis of the received signal S, and to selectively remove the clutter component information from the received signal S using the moving velocity Vc and/or variance $\sigma_c^2$, thereby selectively removing only the clutter components, provided that the Doppler shift frequencies $f_d$ of the clutter components and blood flow component are different from each other. Accordingly, the present invention can realize an ultrasonic doppler diagnostic system with high quality for obtaining the slow blood flow information for the abdomen or the like.

As described above, the ultrasonic doppler diagnostic system according to the present invention comprises: a clutter information detecting means for obtaining the moving velocity of the clutter components and/or the variance of the moving velocity on the basis of the received signal; a clutter information removing means for obtaining a clutter removing signal by selectively removing the clutter component information carried in the received signal from the received signal on the basis of the obtained moving velocity and variance; and a blood flow information detecting means for obtaining blood flow information on the basis of the clutter removing signal, whereby selectively removing only the clutter components separately from the blood flow information, provided that the Doppler shift frequencies $f_d$ of the clutter components and blood flow component are different from each other.

DESCRIPTION OF THE PREFERRED EMBODIMENTS

Hereinafter, there will be described embodiments of the present invention.

Figure 1:
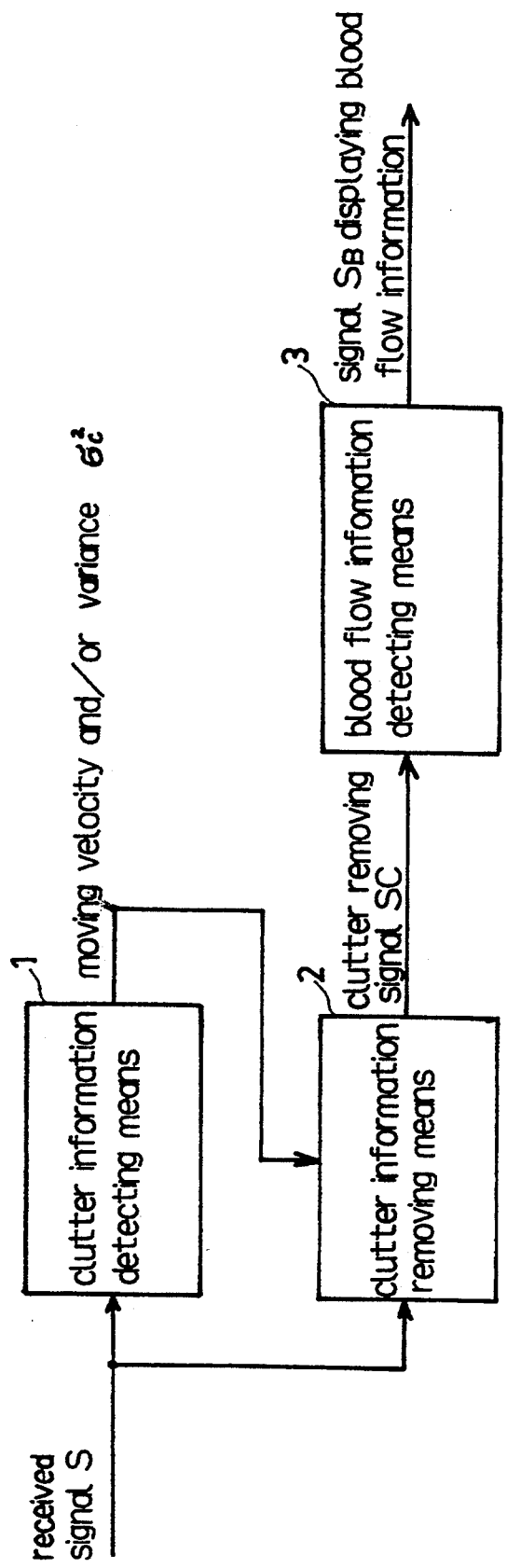
FIG. 1 is a block diagram showing the principle of the individual part of an ultrasonic doppler diagnostic system according to the present invention.
Figure 2:
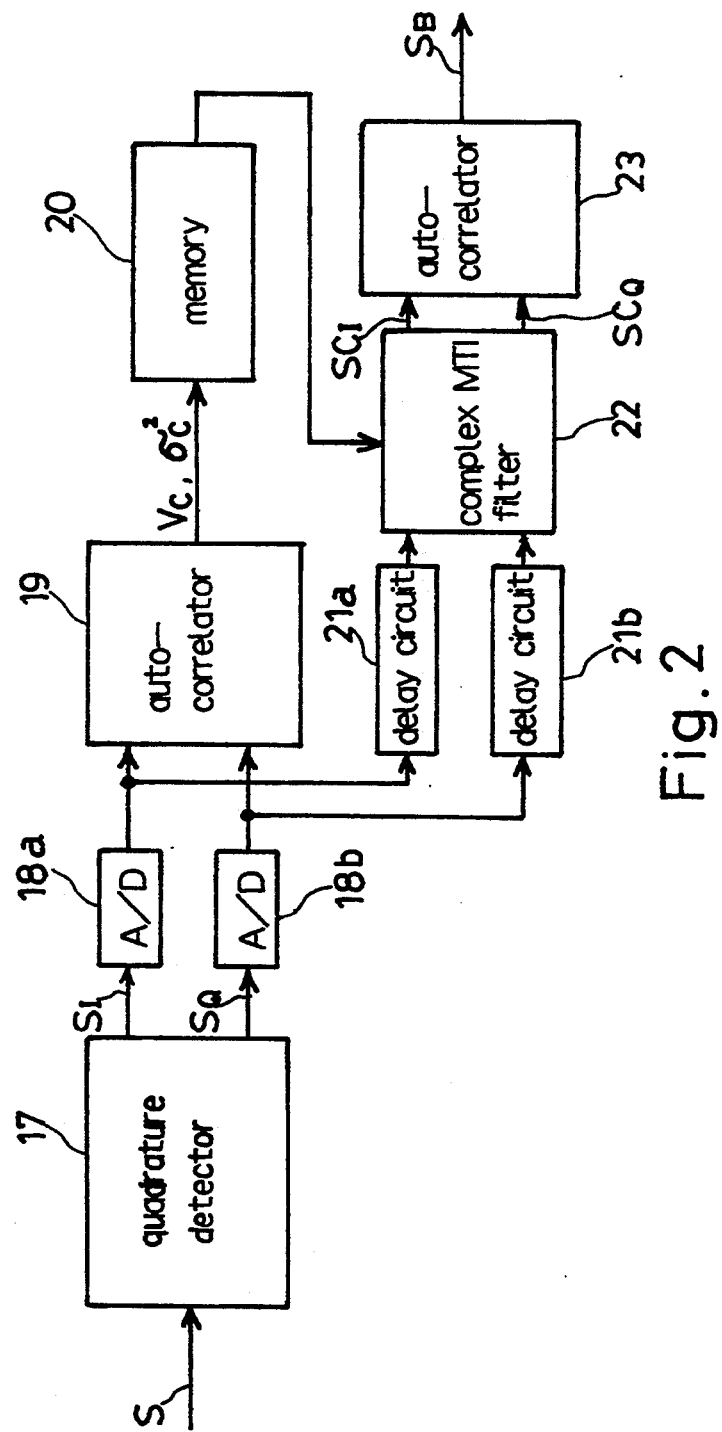
FIG. 2 is a block diagram showing a first embodiment of an ultrasonic doppler diagnostic system according to the present invention.
Figure 3:
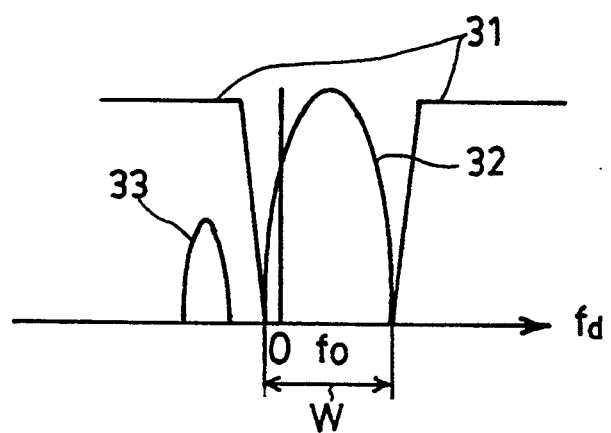
FIG. 3 is a view showing relationship between characteristic and received signal of a complex MTI filter in the first embodiment shown in FIG. 2.

FIG. 2 is a block diagram showing a first embodiment of an ultrasonic diagnostic system according to the present invention, and FIG. 3 is a view showing relationship between characteristic and received signal of a complex MTI filter in the first embodiment shown in FIG. 2. In these figures, the elements corresponding to those in the conventional examples shown in FIGS. 11 to 13 are indicated at the same numerals or symbols, and the explanation thereof is omitted.

Figure 11:
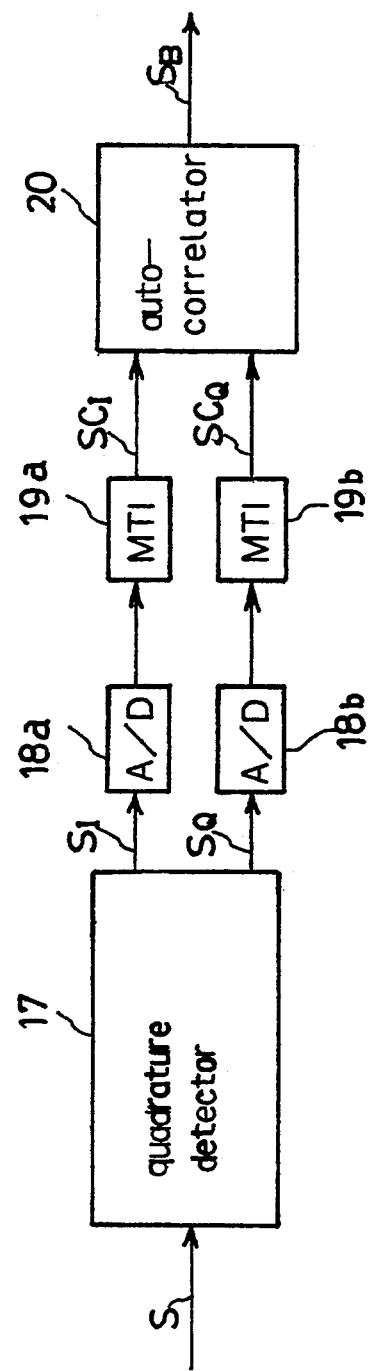
FIG. 11 is a block view showing one example of a conventional ultrasonic diagnostic system.
Figure 12:
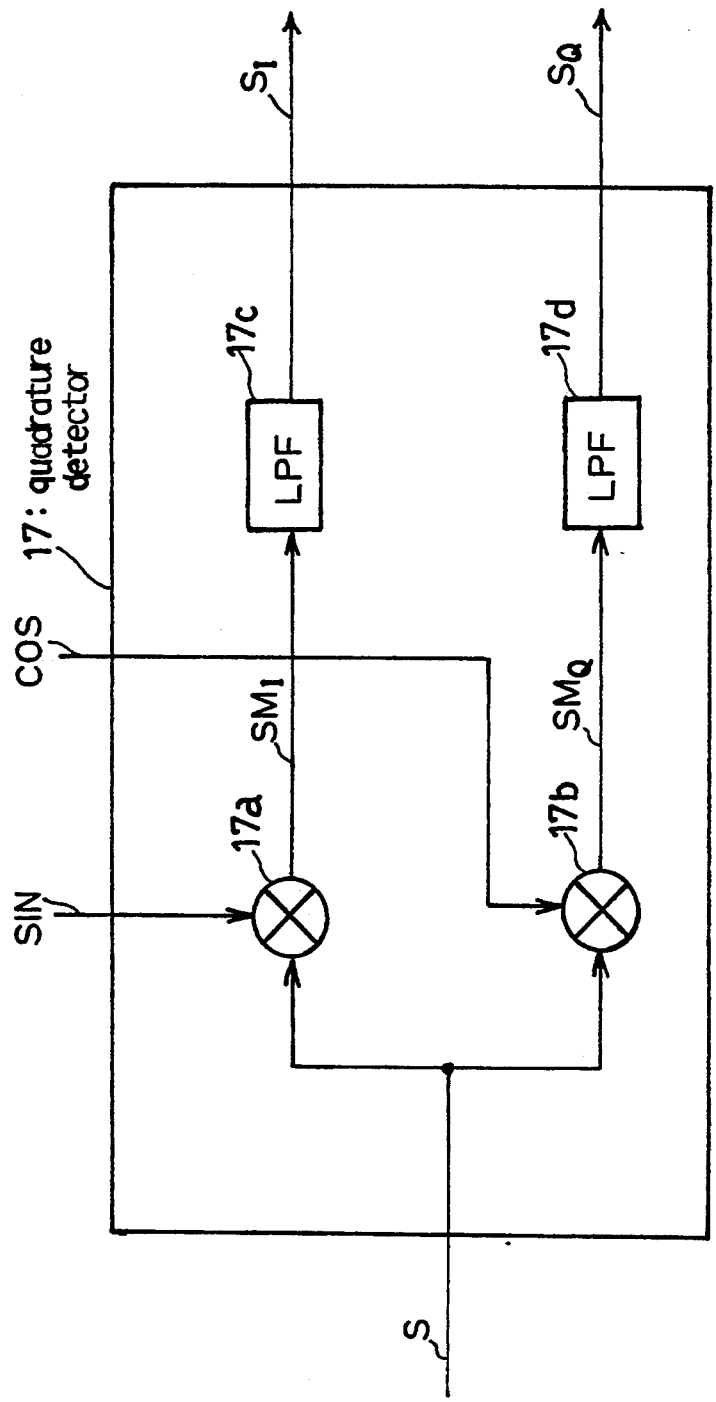
FIG. 12 is a block diagram showing the internal construction of a quadrature detector.
Figure 13A:
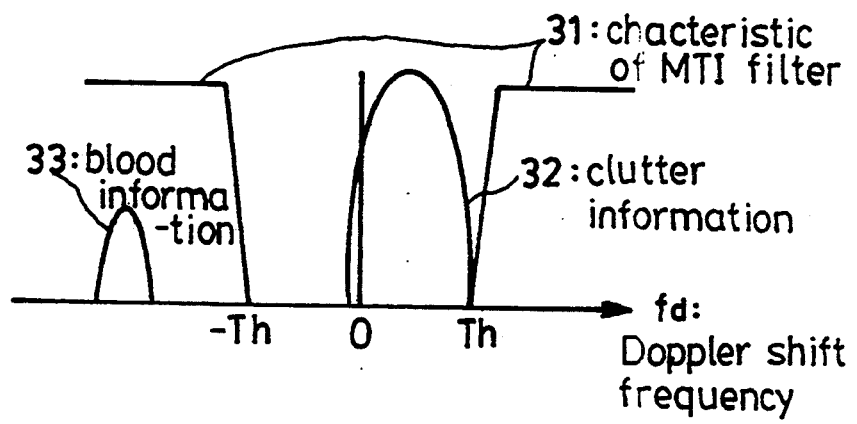
FIGS. 13a and 13b are views showing one example of the characteristic of MTI filter.
Figure 13:
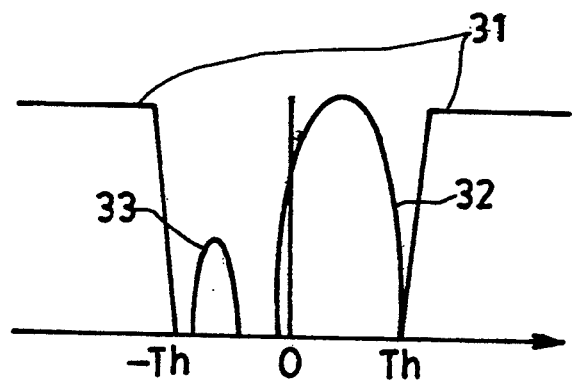

A complex MTI filter 22 has a disadvantage that the number of elements constituting the filter is increased thereby enlarging the magnitude of the circuit compared with the common MTI filter shown in FIGS. 11 and 13. However, it has an advantage of determining the center frequency of the signal elimination band $f_o$ into the value other than zero. This embodiment is made using the above advantage of the complex MTI filter.

An I component $S_I$ and Q component $S_Q$ of the received signal S digitized in two A/D converters 18a and 18b are input to an auto-correlator 19 to be subjected to auto-correlation, thus obtaining a moving velocity Vc and its variance $\sigma_c^2$. In this case, the received signal S input in the auto-correlator 19 includes both the clutter components and blood flow information. However, since the clutter components have a power 100 times (40 dB) as much as the blood flow component, there can be obtained, without any problem, the moving velocity Vc and its variance $\sigma_c^2$ by auto-correlation of the received signal S including the blood flow information. The signal displaying the moving velocity Vc and its variance $\sigma_c^2$ of the clutter components thus obtained is input to a memory 20, which serves as a filter control circuit. The memory 20 previously stores, as the type of look-up table, a corresponding table of the moving velocity Vc corresponding to a coefficient for determining the center frequency $f_o$ of the signal elimination band in the complex MTI filter 22, and a corresponding table of the variance $\sigma_c^2$ corresponding to a coefficient for determining the band width W of the signal elimination band in the complex MTI filter 22. The memory 20 receives the moving velocity Vc and its variance $\sigma_c^2$ obtained in the auto-correlator 19 and outputs the coefficients for determining the center frequency $f_o$ and the band width W of the signal elimination band in the complex MTI filter 22 to the complex MTI filter 22.

Further, the I component $S_I$ and Q component $S_Q$ of the received signal S digitized in the A/D converters 18a and 18b are supplied in respective delay circuit 21a and 21b to be delayed for a time required for inputting the above coefficients obtained in the memory 20 on the basis of the moving velocity Vc and its variance $\sigma_c^2$ to the complex MTI filter 22, and are then input to the complex MTI filter 22. The complex MTI filter 22 has the characteristic determined by the above coefficients so as to selectively remove only clutter components (crest 32) as shown in FIG. 3. Accordingly, the blood flow component (crest 33) can be effectively taken out.

Alternatively, the variance $\sigma_c^2$ of the moving velocity of the clutter components is easily obtained experimentally or experientially. Accordingly, the band width W of the signal elimination band in the complex MTI filter 22 is fixed at the value previously determined experimentally or experientially, and only the moving velocity Vc of the clutter components is obtained in the auto-correlator 19, thus determining the center frequency $f_o$ of the signal elimination band in the complex MTI filter 22. Incidentally, the fixed band width W may be preferably changed according to the measured positions of the human body under examination.

In some determinations of the center frequency $f_o$ and band width W of the signal elimination band in the complex MTI filter 22, the direct current component ($f_d=0$) may be out of the signal cutting-out band. However, there may be input in the complex MTI filter 22 a signal having the unnecessary direct current component caused by offsets of multipliers 17a and 17b as shown in FIG. 12 constituting the quadrature detector 17 and amplifier (not shown). Accordingly, the signal elimination band may preferably include $f_d=0$ so as to cut-off the direct current component of the signal input to the complex MTI filter 22.

Figure 4:
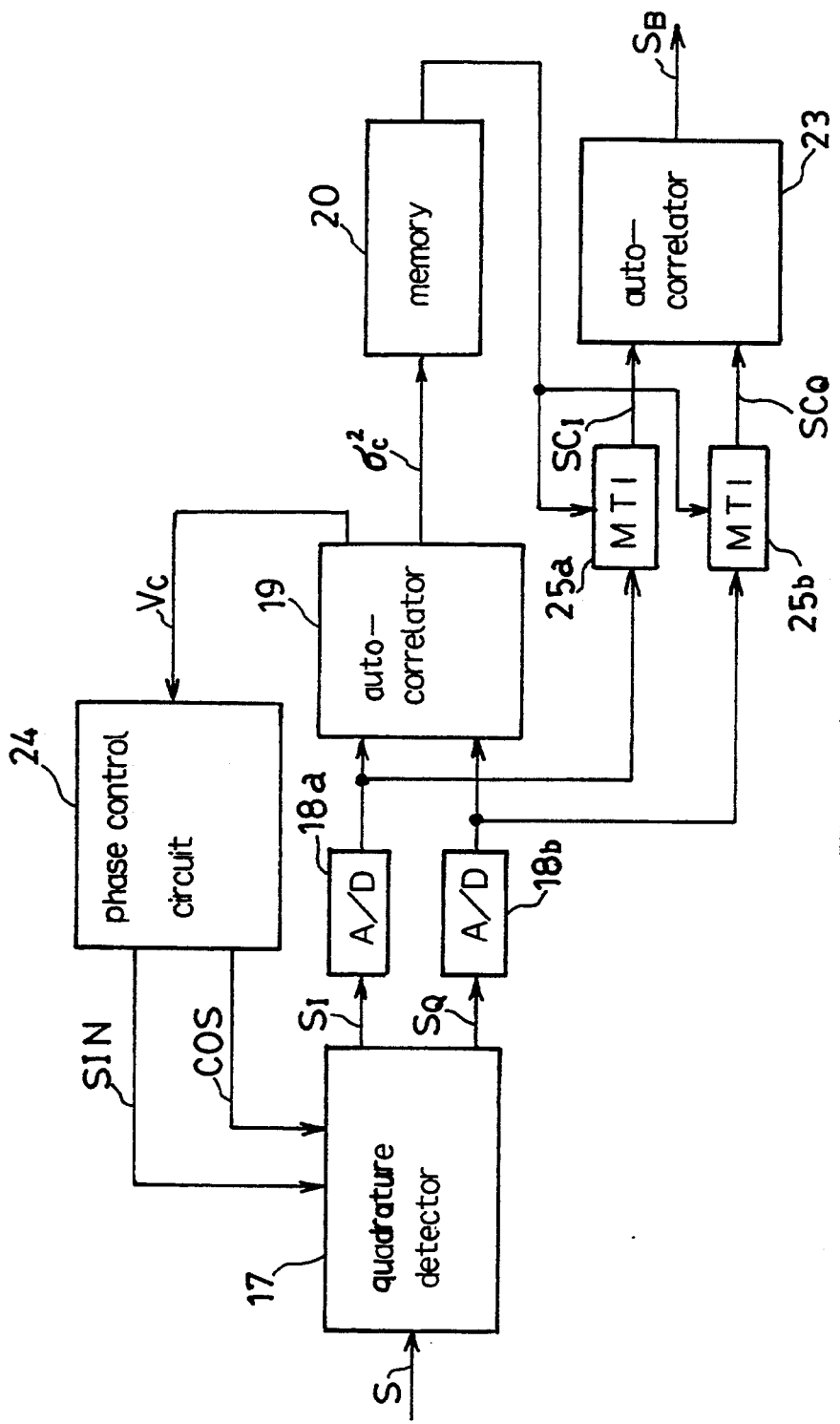
FIG. 4 is a block diagram showing a second embodiment of an ultrasonic diagnostic system according to the present invention.
Figure 5:
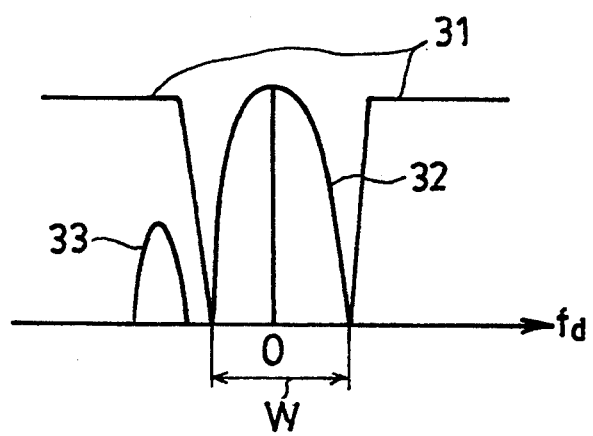
FIG. 5 is a view showing relationship between characteristic and received signal of the MTI filter in the second embodiment shown in FIG. 4.

FIG. 4 is a block diagram showing a second embodiment of an ultrasonic diagnostic system according to the present invention; and FIG. 5 is a view showing relationship between characteristic and received signal of the MTI filter in the second embodiment shown in FIG. 2. In these figures, the elements corresponding to those in the conventional example as shown in FIGS. 11 to 13 and embodiments as shown in FIGS. 2 and 3 are indicated at the same numerals and symbols and the explanation thereof is omitted.

In this embodiment, there is provided a phase control circuit 24 for controlling the phase of the carrier signals SIN and COS (refer to FIG. 12) input to the quadrature detector 17, and consequently the common MTI filters 25a and 25b can be used in place of the complex MTI filter.

In the case of a color Doppler method of superposing the signal displaying the blood flow on the two-dimensional tomographic image thus displaying the blood flow as blue, red or the like, the ultrasonic pulses are transmitted eight times along a given direction in the human body under examination. In this case, the pulses are divided into the first four pulses and the second four pulses. During the measurement in the first four pulses, the auto-correlator 19 obtains the moving velocity Vc of the clutter components and its variance $\sigma_c^2$. Meanwhile, during the second four pulses, the received signal S is input to the auto-correlator 23 through the MTI filters 25a and 25b thus obtaining the blood information therein.

Figure 6:
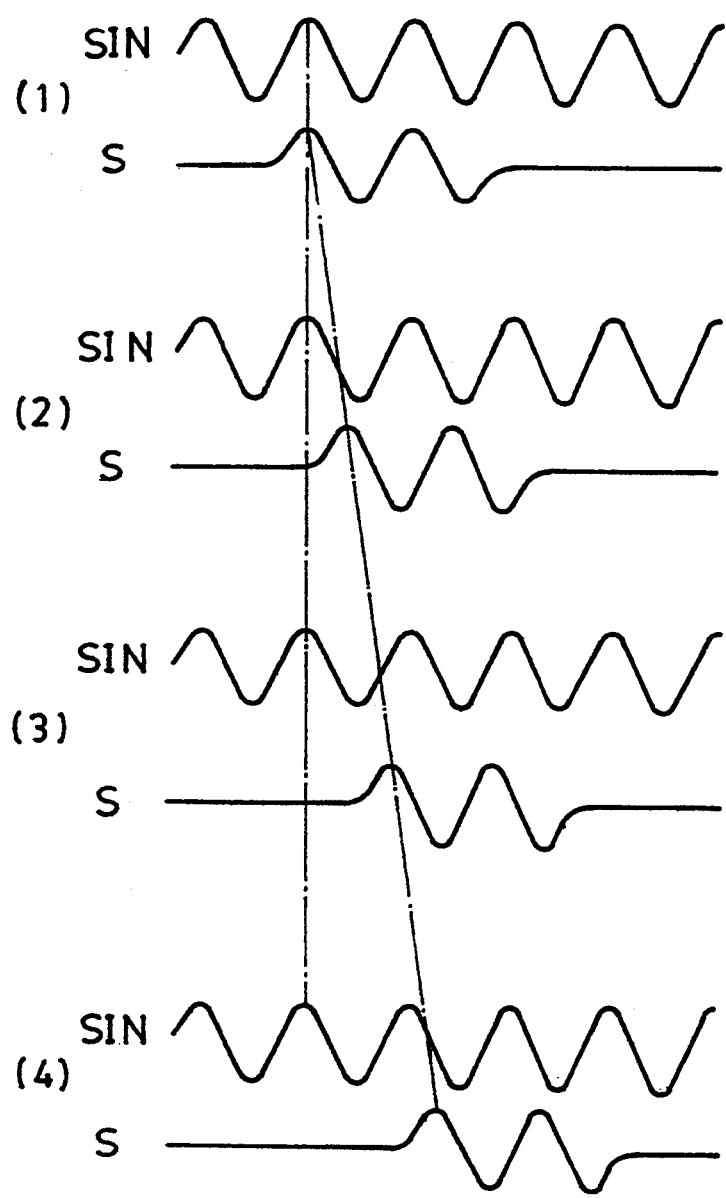
FIG. 6 is a typical view showing phase relationship between carrier signal and received signal prior to phase adjustment.

FIG. 6 is a typical view showing a typical phase relationship between carrier signal SIN and received signal S during the first four pulses, that is, prior to phase adjustment. In the figure, (1), (2), (3) and (4) show four measurements performed in the above order.

The received signal is obtained by reception of the ultrasounds reflected by a reflection point in the human body under examination. In this case, assuming that the reflection point is moved in the specified direction, the received signal S is indicated at the waveform of each received signal as shown in (1) to (4) with the timing of each transmission of the ultrasonic pulses taken as a starting point. Namely, the phase is sequentially changed with movement of the reflection point. Meanwhile, the carrier signal SIN is fixed in its phase, and accordingly, the phase relationship between carrier signal SIN and received signal S differs from each other by each measurement. In this case, the Doppler shift frequency $f_d$ due to the above reflection point is detected as $fd \neq 0$.

Figure 7:
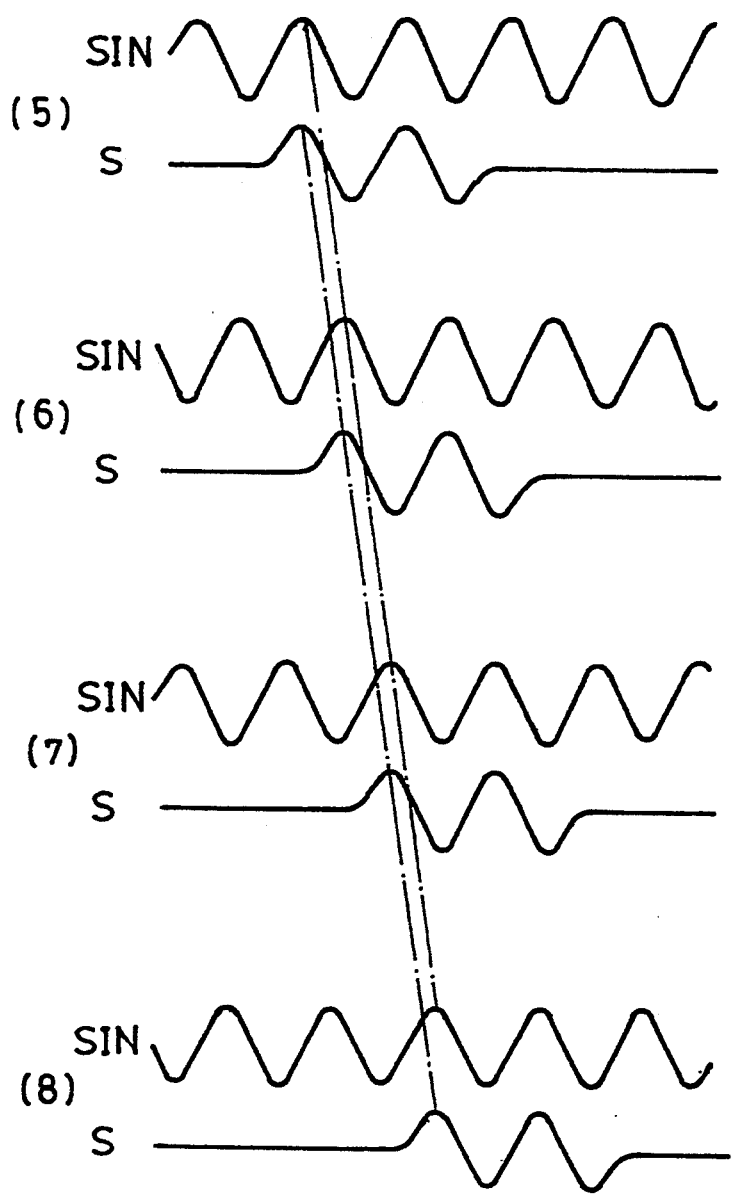
FIG. 7 is a typical view showing phase relationship between carrier signal and received signal after phase adjustment.

FIG. 7 is a view showing a typical phase relationship between carrier signal SIN and received signal S in the second four pulses, that is, after phase adjustment. In this figure, (5), (6), (7) and (8) show the four measurements performed in the above order after the first four measurements (1) to (4).

Similarly to the case shown in FIG. 6, the phase of the received signal S is sequentially changed with movement of the reflection point; however, the phase of the carrier signal SIN is changed for making constant the phase relationship between carrier signal SIN and received signal S. In this case, the Doppler shift frequency $f_d$ is detected as $f_d=0$.

The second embodiment of the present invention shown in FIG. 4 applies the above principle and is so constructed that the auto-correlator 19 obtains the moving velocity Vc and its variance $\sigma_c^2$ on the basis of the measurement in the first four pulses and outputs the moving velocity Vc and its variance $\sigma_c^2$ to the phase control circuit 24 and the memory 20, respectively. In the first four pulses, the phase control circuit 24 generates the carrier signals SIN and COS with the fixed phase as shown in FIG. 6. Meanwhile, in the second four pulses, on the basis of the input moving velocity Vc, the phase control circuit 24 generates the carrier signals SIN and COS in which the phase is adjusted such that the moving velocity Vc appears at the Doppler shift frequency $f_d=0$. The carrier signals SIN and COS are input to the quadrature detector 17. Further, the memory 20 previously stores, as a look-up table, a corresponding table of the variance $\sigma_c^2$ to a coefficient for determining the band width W of the signal elimination band in the MTI filters 25a and 25b. The memory 20 receives the variance $\sigma_c^2$ and calculates a coefficient for determining the band width W of the signal elimination band in the MTI filters 25a and 25b. The coefficient is input to the MTI filters 25a and 25b. Differently from the complex MTI filter, in the MTI filters 25a and 25b, the center frequency $f_o$ of the signal elimination band is fixed at $f_o=0$ and cannot be changed. However, in the second four pulses, since the received signal S ($S_I$, $S_Q$) output from the quadrature detector 17 has a function to carry the clutter component information as distributed around the Doppler shift frequency $f_d=0$, even if the moving velocity Vc of the clutter components is Vc$\neq$0, there can be selectively removed the clutter components by the common MTI filters 25a and 25b. In this second four pulses, the clutter removing signal SC ($SC_I$, $SC_Q$) output from the MTI filters 25a and 25b is supplied to the auto-correlator 23. The auto-correlator 23 generates the signal $S_B$ displaying the blood flow information by auto-correlation.

Compared with the first embodiment mentioned above, the second embodiment has such an advantage as to eliminate the necessity of using the complex MTI filter with a large magnitude of circuit. However, it has the following disadvantages: the phases of the carrier signals SIN and COS in the second measurement are adjusted on the basis of the moving velocity Vc of the clutter components in the first measurement, and consequently, it may be considered that the moving velocity of the clutter components in the first measurement is different from that in the second measurement, which causes the fear of degrading the accuracy of selectively removing the clutter components. Further, the blood flow information is obtained in the second measurement, and consequently, transmitting pulse number of the ultrasounds must be increased to obtain the blood flow information with the same accuracy as that in the first embodiment.

Alternatively, similarly to the first embodiment, in the second embodiment, the auto-correlator 19 calculates only the moving velocity Vc of the clutter components, and the band width W of the signal cutting-out band in the MTI filters 25a and 25b may be fixed at the value obtained experimentally or experientially. In this case, in the second embodiment, there is eliminated the need for the memory 20 for storing the corresponding table of the variance $\sigma_c^2$ to a coefficient for determining the band width W.

Figure 8:
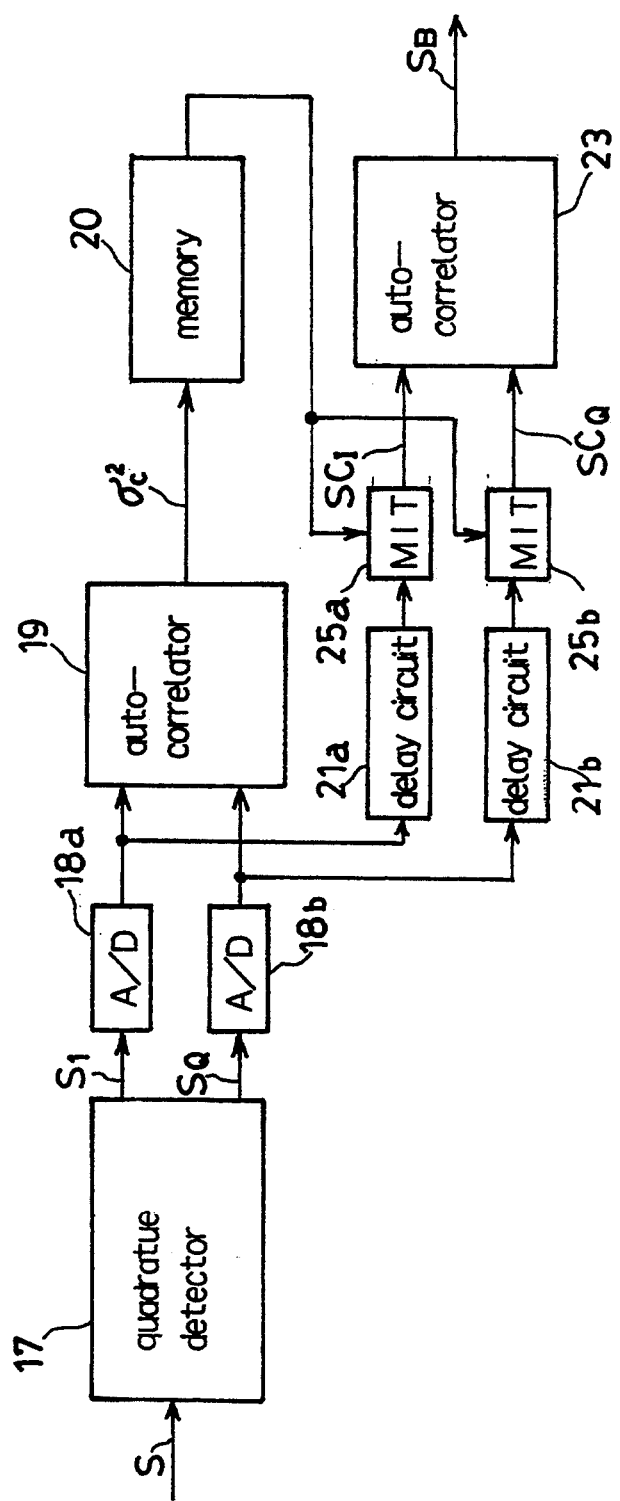
FIG. 8 is a block diagram showing a third embodiment of an ultrasonic doppler diagnostic system.

FIG. 8 is a block diagram showing a third embodiment of an ultrasonic doppler diagnostic system according to the present invention, and FIGS. 9a and 9b are views showing relationship between characteristic and received signal of the MTI filter in the third embodiment as shown in FIG. 8. In these figures, the elements corresponding to those in the conventional examples as shown in FIGS. 11 to 13 and respective embodiments as shown in FIGS. 2 to 7 are indicated at the same numerals and symbols, and the explanation thereof is omitted.

In the third embodiment, as shown in FIG. 8, there are provided the common MTI filters 25a and 25b wherein the center frequency $f_o$ of the signal cutting-out band is fixed as $f_o=0$. Further, the auto-correlator 19 calculates the variance $\sigma_c^2$ of the moving velocity of the clutter components thereby controlling the band width W of the signal elimination band of the MTI filters 25a and 25b.

Figure 9:
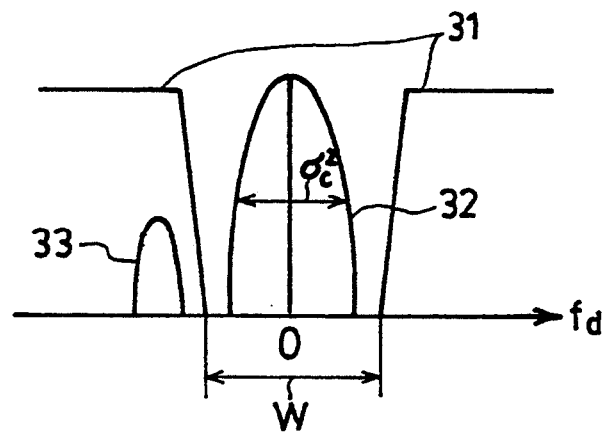
FIGS. 9a and 9b are views showing relationship between characteristic and received signal of the MTI filter in the third embodiment shown in FIG. 8.
Figure 9:
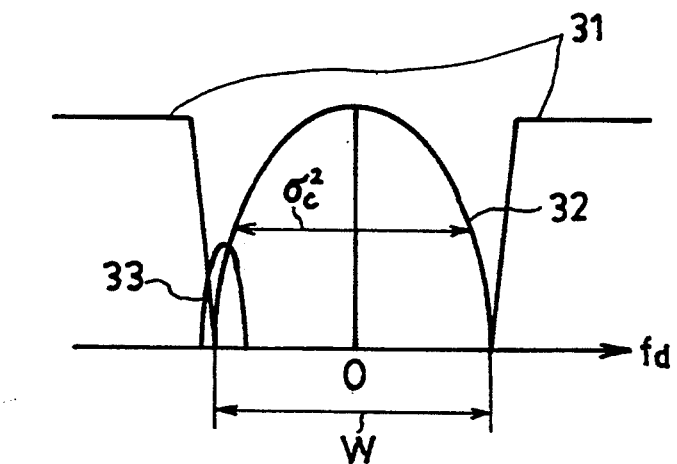
Figure 10:
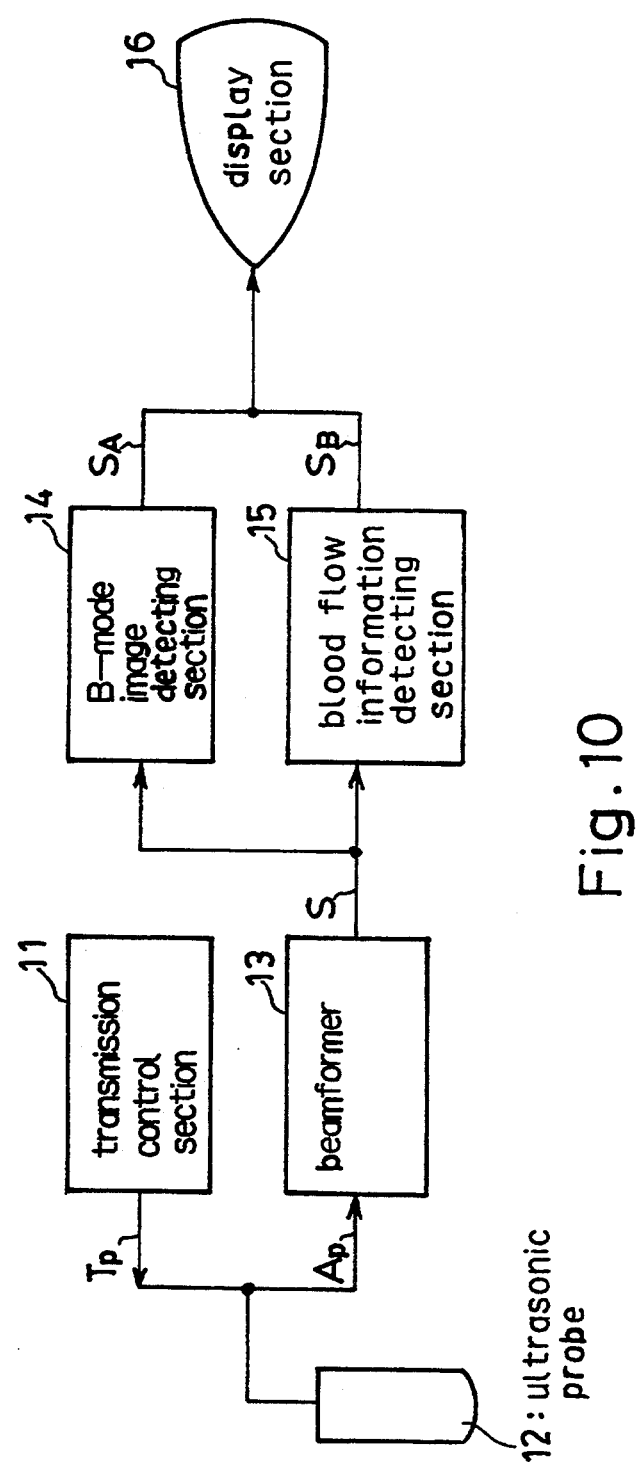
FIG. 10 is a schematic construction view of one example of an ultrasonic diagnostic system.

The third embodiment may be useful for such a case that the internal organs in the human body under examination are trembled or stopped, that is, the clutter components (internal organs) are not moved as a whole (moving velocity V=0) but the variance $\sigma_c^2$ (width of the crest 32) is varied. In this case, by varying the band width W of the signal cutting-out band in the MTI filters 25a and 25b with trembles of the internal organs (large or small of the variance $\sigma_c^2$), the blood flow information (information corresponding to the crest 33) can be taken out at the time when the trembles (variance $\sigma_c^2$) is made smaller as shown in FIG. 9.

As described above, the present invention is so constructed as to obtain the moving velocity Vc and its variance $\sigma_c^2$ on the basis of the received signal S including the clutter components and blood flow information, and to selectively remove the clutter component information on the basis of the obtained moving velocity Vc and the variance $\sigma_c^2$, whereby taking out the blood flow information separately from the clutter component information, provided with the Doppler shift frequencies of the blood flow component and clutter components are different from each other.

As will be apparent from the above embodiments, it is not always required to obtain both the moving velocity Vc and its variance $\sigma_c^2$. According to the accuracy of removing the clutter components and the circumstances of its measurement, by obtaining only the moving velocity Vc or its variance $\sigma_c^2$, there can be selectively removed the clutter components.

The present invention is not limited to the above embodiments. For example, in the above embodiments, digitization is performed after 90-degrees phase detection in analog. However, it may be performed before the 90-degrees phase detection. Further, in the case of the point Doppler method of obtaining the blood flow information at one point in the human body under examination, the received signal is digitized and is then subjected to Fourier transformation, thus detecting the moving velocity Vc and its variance $\sigma_c^2$ of the clutter components in the frequency region, selectively removing the clutter components, and detecting the blood flow information.

I claim:

1. An ultrasonic doppler diagnostic system for obtaining blood flow information from a human body under examination by transmitting ultrasound signals into the human body and receiving a received signal reflected therefrom, said ultrasonic doppler diagnostic system comprising:

clutter information detecting means for detecting at least one of a moving velocity signal and its variance of clutter components from said received signal;

clutter information removing means for selectively removing clutter component information, carried in said received signal, from said received signal responsive to said one of said moving velocity signal and said variance obtained in said clutter information detecting means and for producing a clutter-removed, received signal; and blood flow information detecting means for detecting said blood flow information from said received signal, responsive to said clutter-removed, received signal detected in said clutter information removing means.

2. An ultrasonic doppler diagnostic system according to claim 1, further comprising:

a quadrature detector which detects said received signal by 90-degree phase detection; and said clutter information removing means further comprises a complex MTI filter which receives said received signal, detected by 90-degree phase detection in said quadrature detector, and outputs said clutter-removed, received signal and a filter control circuit which determines the center frequency of a signal elimination band of said complex MTI filter responsive to said moving velocity signal obtained in said clutter information detecting means.

3. An ultrasonic diagnostic system according to claim 2, wherein said filter control circuit determines the characteristic of said MTI filter by cutting off a direct current component of said received signal input to said complex MTI filter.

4. An ultrasonic doppler diagnostic system for obtaining blood flow information from a human body under examination by transmitting ultrasound signals into the human body and receiving a received signal reflected therefrom, said ultrasonic doppler diagnostic system comprising:

clutter information detecting means for detecting at least one of a moving velocity signal and its variance of clutter components from said received signal, wherein said clutter information detecting means detects said variance together with said moving velocity signal;

clutter information removing means for selectively removing clutter component information, carried in said received signal, from said received signal responsive to said one of said moving velocity signal and said variance obtained in said clutter information detecting means and for producing a clutter-removed, received signal;

blood flow information detecting means for detecting said blood flow information from said received signal, responsive to said clutter-removed, received signal detected in said clutter information removing means;

a quadrature detector which detects said received signal by 90-degree phase detection;

said clutter information removing means further comprises a complex MTI filter which receives said received signal detected by 90-degree phase detection in said quadrature detector and outputs said clutter removed signal, and a filter control circuit which determines the center frequency of a signal elimination band of said complex MTI filter responsive to said moving velocity signal obtained in said clutter information detecting means; and said filter control circuit obtains said center frequency and a band width of a signal cutting-out band in said complex MTI filter responsive to said variance obtained in said clutter information detecting means.

5. An ultrasonic diagnostic system according to claim 4, wherein said filter control circuit determines the characteristic of said MTI filter in such a manner as to cut-off a direct current component of said received signal input to said complex MTI filter.

6. An ultrasonic doppler diagnostic system for obtaining blood flow information from a human body under examination by transmitting ultrasound signals into the human body and receiving a received signal reflected therefrom, said ultrasonic doppler diagnostic system comprising:

clutter information detecting means for detecting at least one of a moving velocity signal and its variance of clutter components from said received signal, wherein said clutter information detecting means detects at least said moving velocity signal;

clutter information removing means for selectively removing clutter component information, carried in said received signal, from said received signal responsive to said one of said moving velocity signal and said variance obtained in said clutter information detecting means and for producing a clutter-removed, received signal, wherein said clutter information removing means further comprises an MTI filter which receives said received signal detected by 90 degree phase detection in said quadrature detector and outputs said clutter-removed, received signal;

blood flow information detecting means for detecting said blood flow information from said received signal, responsive to said clutter-removed, received signal detected in said clutter information removing means a quadrature detector which detects said received signal by 90 degree phase detection; and a phase control circuit which controls the phase of carrier signals input to said quadrature detector from said moving velocity signal obtained in said clutter information detecting means in such a manner that a direct current component of said received signal output from said quadrature detector carries moving velocity information of clutter components.

7. An ultrasonic doppler diagnostic system according to claim 6, wherein said clutter information detecting means detects said variance together with said moving velocity signal; and said clutter information removing means further comprises a filter control circuit which determines a band width of a signal elimination band in said MTI filter responsive to said variance obtained in said clutter information removing means.

8. An ultrasonic diagnostic system for obtaining blood flow information from a human body under examination by transmitting ultrasound signals into the human body and receiving a received signal reflected therefrom, said ultrasonic doppler diagnostic system comprising:

clutter information detecting means for detecting at least one of a moving velocity signal and its variance of clutter components from said received signal, said clutter information detecting means detects at least said variance;

a quadrature detector detecting said received signal by 90 90 degree phase detection;

clutter information removing means for selectively removing clutter component information, carried in said received signal, from said received signal responsive to said one of said moving velocity signal and said variance obtained in said clutter information detecting means and for producing a clutter-removed, received signal, said clutter information removing means further comprises an MTI filter which receives said received signal detected by 90 degree phase detection in said quadrature detector, and a filter control circuit which determines a band width of a signal elimination band in said MTI filter responsive to said variance obtained in said clutter information detecting means; and blood flow information detecting means for detecting said blood flow information from said received signal, responsive to said clutter-removing, received signal obtained in said clutter information removing means.

* * * * *

UNITED STATES PATENT AND TRADEMARK OFFICE
CERTIFICATE OF CORRECTION

PATENT NO. : 5,383,464
DATED : January 24, 1995
INVENTOR(S) : Akira SHIBA

It is certified that error appears in the above-indentified patent and that said Letters Patent is hereby corrected as shown below:

Column 1, line 5, delete "1."

line 14, delete "2.";

line 16, change "," to a space.

Column 2, line 30, change "No" to --No.--.

Column 3, line 8, delete "the" (second occurrence).

Column 9, line 67, change "$S_B$" to --SB--.

Column 14, line 7, delete "90" (first occurrence).

Signed and Sealed this

Eleventh Day of July, 1995

BRUCE LEHMAN

*Attest:*

*Attesting Officer*      *Commissioner of Patents and Trademarks*

UNITED STATES PATENT AND TRADEMARK OFFICE
CERTIFICATE OF CORRECTION

PATENT NO. :   5,383,464
DATED      :   January 24, 1995
INVENTOR(S) :  Akira SHIBA It is certified that error appears in the above-indentified patent and that said Letters Patent is hereby corrected as shown below:

On the Title Page,    Item [30]
                              please insert the following:
--Foreign Application Priority Data
July 2, 1991    [JP]    Japan.......3-161913--.

Signed and Sealed this

Fifteenth Day of October, 1996

Attest:

BRUCE LEHMAN

*Attesting Officer*    *Commissioner of Patents and Trademarks*